United States Patent
Goodier

(10) Patent No.: US 9,981,607 B2
(45) Date of Patent: May 29, 2018

(54) HYDRAULIC OIL COOLER HAVING STEPS

(71) Applicant: PARAGON TANK TRUCK EQUIPMENT, LLC, Milwaukee, WI (US)

(72) Inventor: Peter Charles Goodier, White, GA (US)

(73) Assignee: PARAGON TANK TRUCK EQUIPMENT, LLC, Milwaukee, WI (US)

( * ) Notice: Subject to any disclaimer, the term of this patent is extended or adjusted under 35 U.S.C. 154(b) by 0 days. days.

(21) Appl. No.: 15/289,799

(22) Filed: Oct. 10, 2016

(65) Prior Publication Data

US 2018/0099615 A1 Apr. 12, 2018

(51) Int. Cl.
*B60R 3/00* (2006.01)
*B60K 11/02* (2006.01)

(52) U.S. Cl.
CPC ............... *B60R 3/00* (2013.01); *B60K 11/02* (2013.01)

(58) Field of Classification Search
CPC ........... B60R 3/00; B60R 3/005; E02F 9/0833
See application file for complete search history.

(56) References Cited

U.S. PATENT DOCUMENTS

| | | | | |
|---|---|---|---|---|
| 4,074,786 A | * | 2/1978 | Joubert | B60R 11/06 180/68.5 |
| 5,064,023 A | * | 11/1991 | Loeber | B60R 3/00 182/127 |
| 7,677,514 B1 | * | 3/2010 | Palmer | B60K 15/067 248/228.1 |
| 9,156,405 B1 | * | 10/2015 | Levesque | B60R 3/00 |
| 2003/0127258 A1 | * | 7/2003 | Lansberry | B62D 55/02 180/9.36 |
| 2004/0178602 A1 | * | 9/2004 | King | B60R 3/00 280/163 |
| 2011/0277961 A1 | * | 11/2011 | Knepper | F01P 3/18 165/104.19 |
| 2016/0101738 A1 | * | 4/2016 | Iotti | E06C 5/04 182/207 |
| 2016/0129783 A1 | * | 5/2016 | Tamura | B60K 15/067 180/344 |
| 2016/0280138 A1 | * | 9/2016 | Tsutsumi | B60R 3/02 |

* cited by examiner

*Primary Examiner* — Brian L Swenson
(74) *Attorney, Agent, or Firm* — Christopher C. Dremann, P.C.; Christopher C. Dremann

(57) ABSTRACT

A hydraulic oil cooler is provided with steps for allowing a person to access a rear portion of a tank truck. The hydraulic oil cooler includes a housing having a first side, a second side opposite the first side, and a front side extending between the first side and the second side. The housing is configured for attachment to a frame rail of the tank truck. The hydraulic oil cooler further includes at least a bottom step and an intermediate step disposed on the housing with the bottom step and the intermediate step extending outwardly from the front side of the housing. The width of the bottom step and the intermediate step is between about 254 millimeters (10 inches) and about 609.6 millimeters (24 inches). The steps are made of a slip-resistant and self-cleaning material and have a predetermined surface pattern for increasing the amount of gripping and traction of the steps.

18 Claims, 4 Drawing Sheets

HYDRAULIC OIL COOLER HAVING STEPS

FIELD OF THE INVENTION

The present invention relates generally to equipment for trucks and truck-tractors. More particularly, the invention relates to tank truck equipment having steps for providing access to a rear portion of a tank truck.

BACKGROUND OF THE INVENTION

Commercial motor vehicles, and more specifically semi-trailer trucks, are commonly used to transport goods and materials throughout the United States. A semi-trailer truck is a combination of a powered truck-tractor and at least one unpowered semi-trailer that is attached to the rear of the truck-tractor and carried by the truck-tractor. A particular type of semi-trailer truck configured for transporting dry bulk solid goods and/or liquid materials combines a tank trailer with a tank tractor, which is also commonly known as a tank truck.

The Federal Motor Carrier Safety Administration (FMCSA) establishes rules and regulations governing commercial motor vehicles, including semi-trailer trucks. One such FMCSA regulation, entitled "Employee Safety and Health Standards" is codified at Title 49, Part 399 of the Code of Federal Regulations. Part 399 of Title 49 prescribes step, handhold and deck requirements on commercial motor vehicles that are intended to enhance the safety of motor carrier employees. Subpart 399.207 of Title 49 specifically addresses truck and truck-tractor access requirements, including the design, size and construction of steps for providing access to the rear portion of the truck or truck-tractor above the frame rails and behind the cab.

Through the years, the amount of hydraulic, pneumatic, mechanical and/or electrical equipment that is located on the rear of a truck or truck-tractor has increased dramatically. This is especially true in the case of a tank truck, which typically must be provided with equipment for loading and unloading both dry bulk solid good and liquid materials from a tank trailer, in addition to the mechanical, electrical and/or pneumatic equipment necessary to couple and uncouple the tank trailer and tank truck. As a result, the amount of space available on the rear of the tank truck, and in particular, along the frame rail of the tank truck behind the driver's side of the cab, has all but disappeared.

The previously mentioned Subpart 399.207 of the FMCSA regulations requires that steps be provided for accessing the rear portion behind the cab of a truck or truck-tractor. The steps must be of a minimum depth and a minimum width for two foot access. Steps in compliance with 49 C.F.R. § 399.207 are currently affixed to the rear portion of a tank truck at a convenient location along the length of one of the frame rails, typically on the driver's side of the tank truck. However, as the amount and/or the size of tank truck equipment provided on the tank truck has increased, there is less and less space available along the length of the frame rail to attach steps of sufficient size to accommodate both feet of a person accessing an area behind the cab on the rear portion of the thank truck. As a result, it has been necessary to relocate certain of the tank truck equipment to a less convenient location on the rear of the tank truck. Complying with the requirements of Subpart 399.207 has led to non-uniform and less desirable configurations of tank truck equipment on the rear of the tank truck, resulting in confusion and dissatisfaction among operators.

Accordingly, there exists an unresolved need for tank truck equipment having steps for accessing the rear portion of a tank truck above the frame rails and behind the cab of the tank truck. More particularly, there exists a need for tank truck having steps in compliance with the FMCSA regulations codified at Part 399 of Title 49 of the Code of Federal Regulations. There exists a specific need for a hydraulic oil cooler having steps for accessing the rear portion of a tank truck wherein the steps meet the specific requirements of Subpart 399.207 of the FMCSA regulations.

SUMMARY OF THE INVENTION

In one aspect, the present invention provides tank truck equipment for a tank truck including a housing defining an enclosure for housing at least one component of the tank truck equipment with the housing being configured for attachment to a frame rail of the tank truck. The tank truck equipment further includes steps disposed on the housing for accessing a rear portion of the tank truck.

In one embodiment, the housing includes a first side, a second side opposite the first side, and a front side extending between the first side and the second side with one or more of the steps disposed adjacent the front side of the housing. In another embodiment, the steps include at least one mounting plate for mounting the steps to the housing of the tank truck equipment with the at least one mounting plate being affixed to the steps and to one of the first side and the second side of the housing. In another embodiment, the housing includes at least one mounting flange for mounting the housing to the frame rail of the tank truck with the at least one mounting flange affixed to one of the first side and the second side of the housing and to the frame rail of the tank truck.

In yet another embodiment, the steps of the tank truck equipment include at least a bottom step and an intermediate step with each of the bottom step and the intermediate step being of sufficient size to accommodate two feet of a person utilizing the steps to access the rear portion of the tank truck. In yet another embodiment, the width of each of the bottom step and the intermediate step is at least about 254 millimeters (10 inches). In yet another embodiment, the width of each of the bottom step and the intermediate step is between about 254 millimeters (10 inches) and about 609.6 millimeters (24 inches). In yet another embodiment, the width of each of the bottom step and the intermediate step is between about 304.8 millimeters (12 inches) and about 381 millimeters (15 inches).

In still another embodiment, the steps may be made of a slip-resistant material and include a predetermined surface pattern on an upper surface for increasing the amount of gripping and traction provided by the steps. The predetermined surface pattern may include at least one of a plurality of openings formed through the step and a plurality of raised protuberances on the upper surface of the step. The steps may further be made of a self-cleaning material so that foreign matter does not accumulate on an upper surface of the steps.

In another aspect, the present invention provides a hydraulic oil cooler for a tank truck including a housing defining an enclosure having a first side, a second side opposite the first side, and a front side extending between the first side and the second side with the housing configured for attachment to a frame rail of the tank truck. The hydraulic oil cooler further includes steps comprising at least a bottom step and an intermediate step disposed on the housing for accessing a rear portion of the tank truck.

In one embodiment, the bottom step and the intermediate step extend outwardly from the front side of the housing. In another embodiment, the steps further include a top step disposed adjacent a top side of the housing. In another embodiment, the width of each of the bottom step and the intermediate step is between about 254 millimeters (10 inches) and about 609.6 millimeters (24 inches). In yet another embodiment, the steps are made of a slip-resistant material that is self-cleaning, and the steps further include a predetermined surface pattern on an upper surface for increasing the amount of gripping and traction provided by the steps.

BRIEF DESCRIPTION OF THE DRAWINGS

The following detailed description of the invention is best understood with reference to the accompanying drawing figures, in which like reference characters refer to the same or similar parts of the invention.

DETAILED DESCRIPTION OF THE INVENTION

Figure 1:
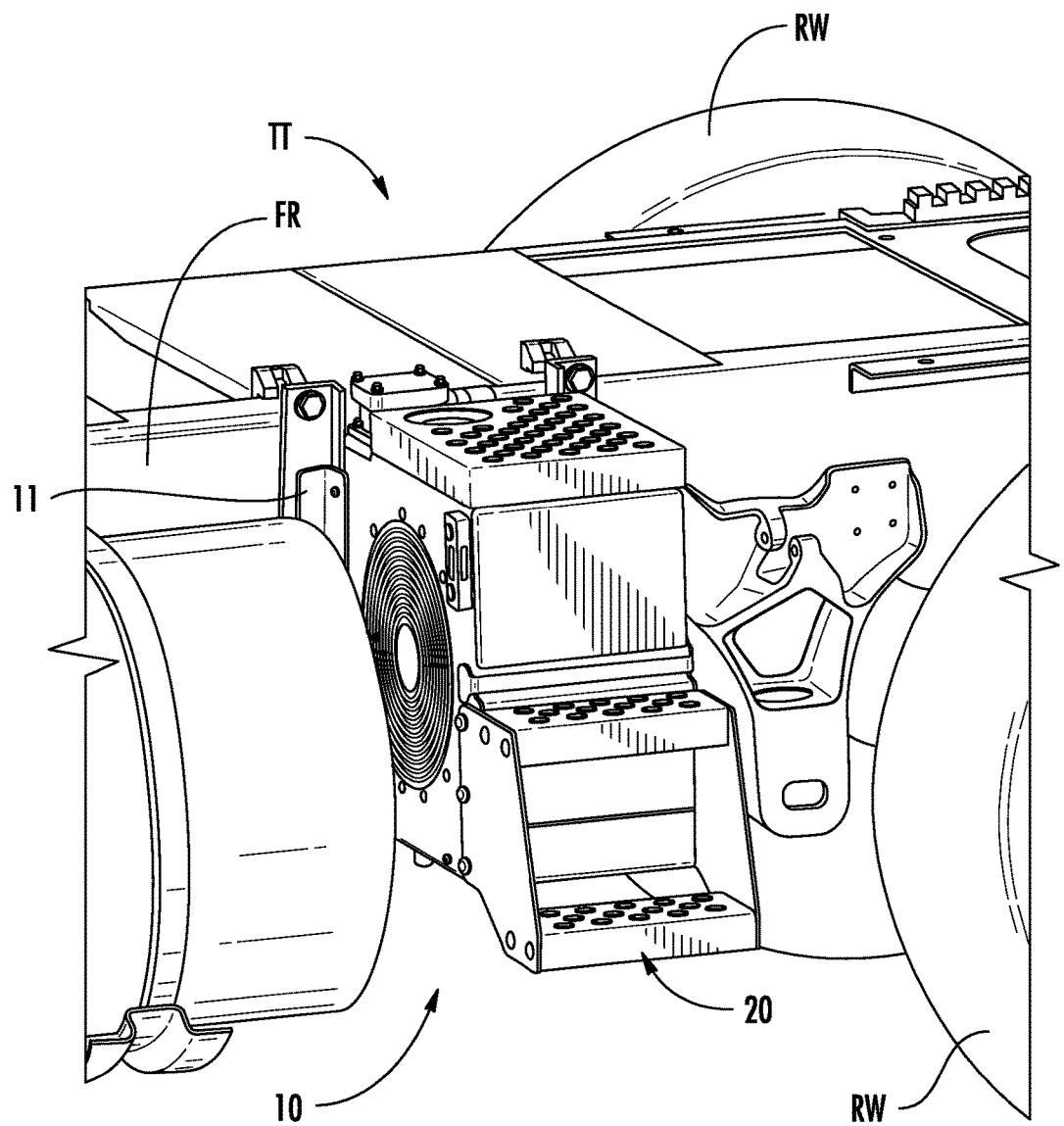
FIG. 1 is an environmental perspective view illustrating an exemplary embodiment of a hydraulic oil cooler having steps according to the present invention mounted on a frame rail of a tank truck.

Referring now to the accompanying drawing figures wherein like reference characters denote like elements throughout the various views, FIG. 1 illustrates a truck-tractor, also referred to herein as a tank truck, indicated generally by reference character TT. Tank truck TT may be of a type that is coupled with a tank trailer (not shown) to transport goods or materials in a known manner. The tank truck TT has at least one side frame rail FR disposed between the cab (not shown) and the rear wheels RW of the tank truck. The frame rail FR provides a mounting surface and area for mounting equipment utilized with the tank truck TT and/or the tank trailer. Such equipment is commonly referred to as "tank truck equipment" and may include mechanical, electrical, pneumatic and/or hydraulic equipment for loading and unloading the tank trailer, as well as for coupling and uncoupling the tank trailer and the tank truck.

Oftentimes, there is only a limited amount of space available along the length of the frame rail FR for the tank truck equipment due to the presence of other components of the tank truck TT, such as a fuel tank, battery box, etc. In addition to tank truck equipment, the aforementioned regulation of the Federal Motor Carrier Safety Administration (FMCSA) codified at 49 C.F.R. § 399.207 requires that:

[a]ny person entering or exiting the cab or accessing the rear portion of a high profile COE truck or truck-tractor shall be afforded sufficient steps and handholds and/or deck plates to allow the user to have at least 3 limbs in contact with the truck or truck-tractor at any time. This rule applies to intermediate positions as well as transitions between intermediate positions, To allow for changes in climbing sequence, the step design shall include, as a minimum, one intermediate step of sufficient size to accommodate two feet.

Part 399, Subpart 207 further requires "the vertical height of the first step shall be no more than 609 millimeters (24 inches) from ground level." In addition, the regulation specifies that the construction of each step "shall be of a slip resistant design which minimizes the accumulation of foreign matter" and when practicable "a self-cleaning material should be used." Part 399, Subpart 205 defines a slip resistant material as "[a]ny material designed to minimize the accumulation of grease, ice, mud or other debris and afford protection from accidental slipping." In addition, Subpart 207 dictates that the "[s]tep depth or clearance and the step width necessary to accommodate a climbing person are defined by using a minimum 127 millimeter (5 inch) diameter disc" and for two-foot accommodation "[t]wo discs shall fit on a tread rung, or in a step recess, with no exterior overhang."

There are many instances in which an operator or other person must access the rear portion of a tank truck TT. Consequently, the tank truck TT must be equipped with steps and handholds in compliance with Part 399 of the FMCSA regulations, including at least one intermediate step of sufficient size to accommodate two feet in the manner set forth in Subpart 207. Steps in compliance with 49 C.F.R. § 399.207 are currently affixed to the rear portion of the tank truck TT at a convenient location along the length of one of the frame rails FR, typically on the driver's side of the tank truck TT. However, as the amount and/or the size of tank truck equipment provided on the tank truck TT has increased, there is less and less space available along the length of the frame rail FR to attach steps of sufficient size to accommodate the feet of a person accessing an area behind the cab on the rear portion of the thank truck TT. As a result, it has been necessary to relocate certain of the tank truck equipment to a less convenient location on the rear of the tank truck TT. The present invention overcomes the need to relocate tank truck equipment and/or other components of the tank truck TT by combining the requisite steps with tank truck equipment, as will be described hereafter.

Figure 2:
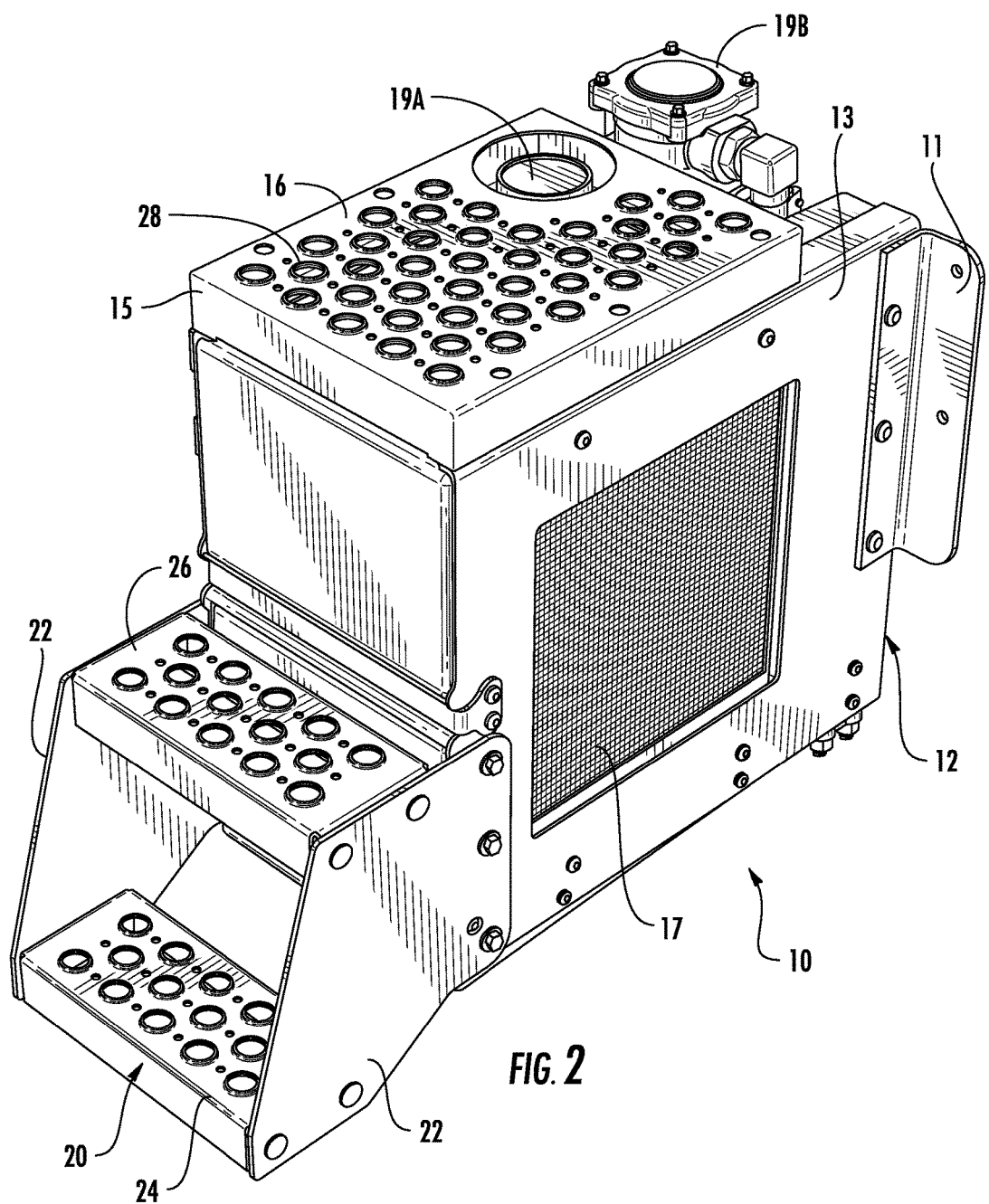
FIG. 2 is a perspective view of the hydraulic oil cooler shown in FIG. 1.
Figure 3:
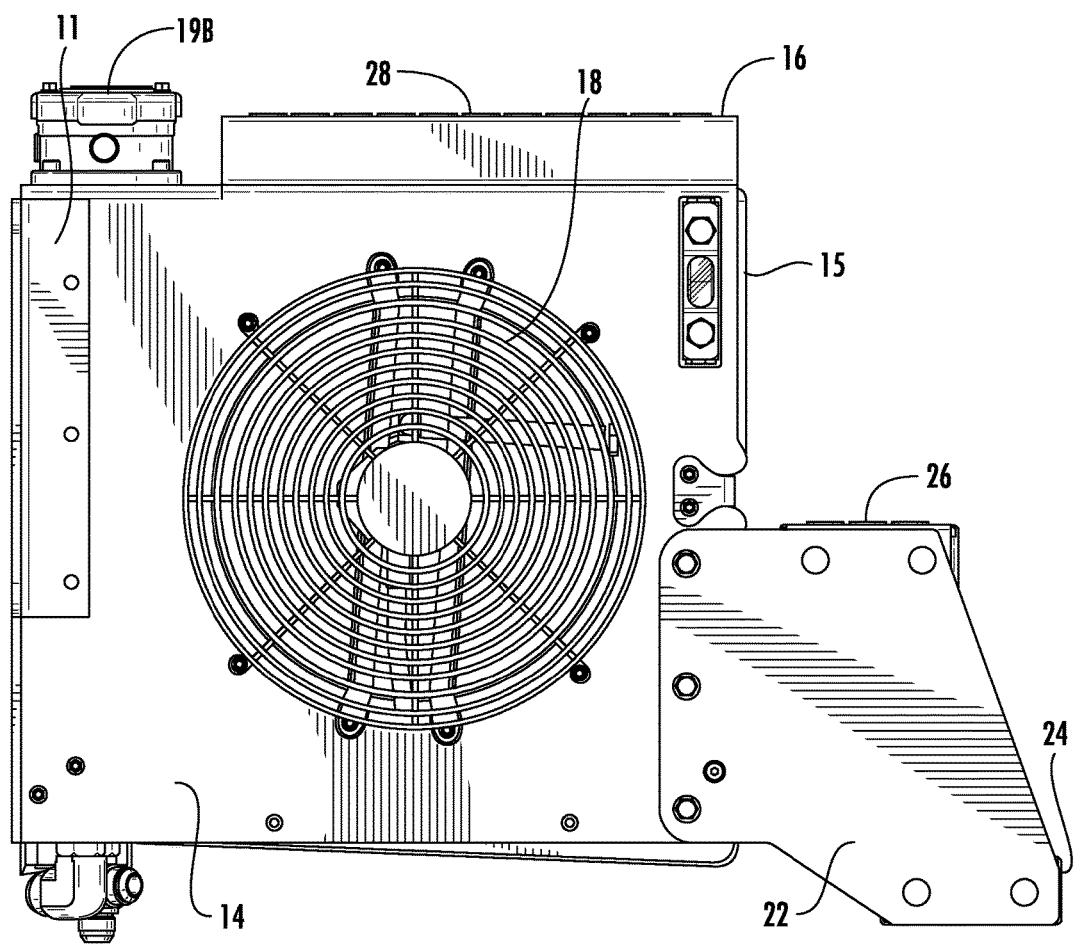
FIG. 3 is a side elevation view of the hydraulic oil cooler shown in FIG. 2.
Figure 4:
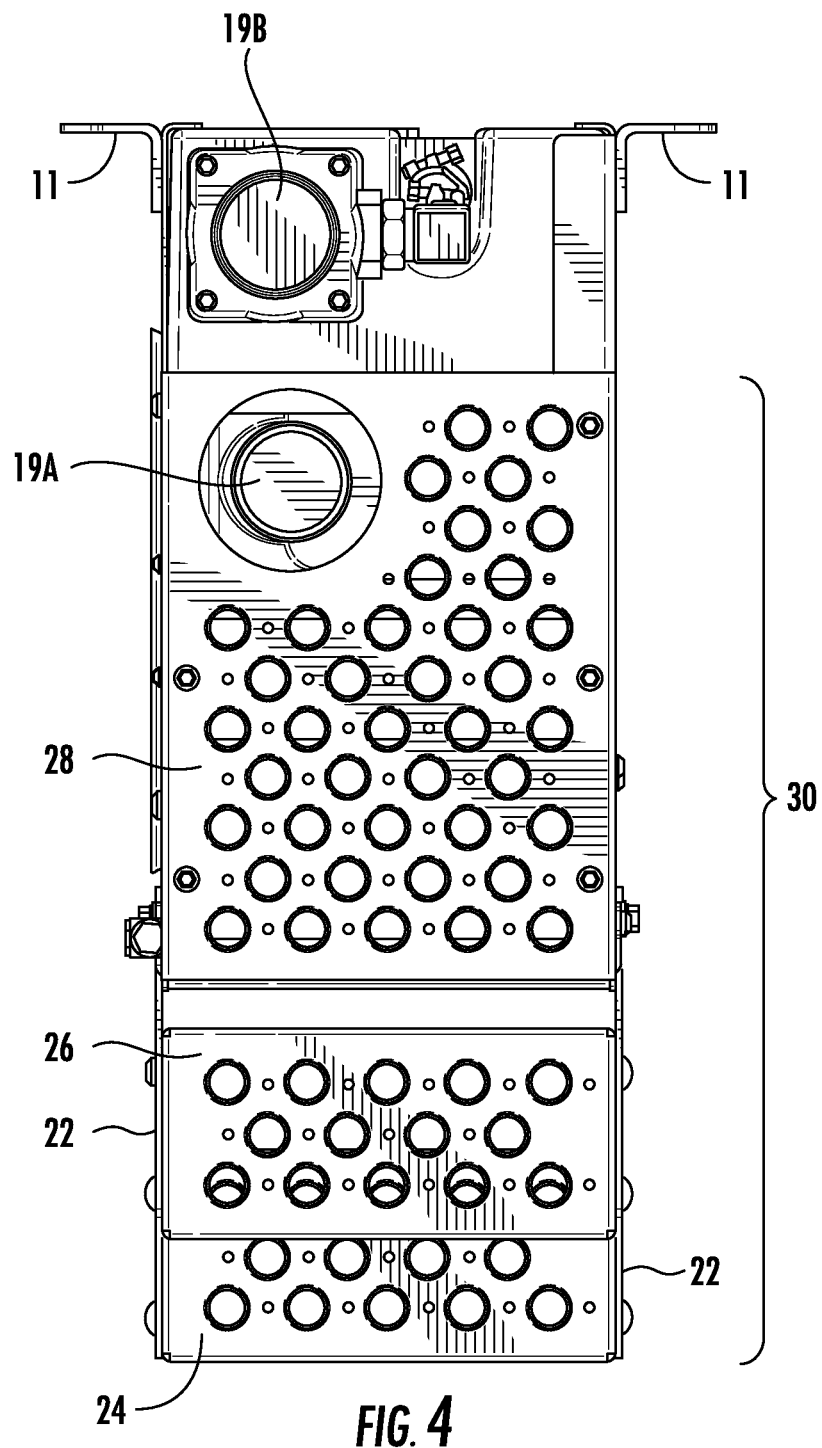
FIG. 4 is a top plan view of the hydraulic oil cooler shown in FIG. 2.

FIGS. 2-4 show tank truck equipment having steps in compliance with the Part 399 of the FMCSA regulations according to an exemplary embodiment of the present invention. In the exemplary embodiments of the invention shown and described herein, the tank truck equipment of the tank truck TT comprises a hydraulic oil cooler 10 having steps 20 constructed in compliance with the FMCSA regulations governing employee safety and health standards codified at 49 C.F.R. § 399.207. As shown and described herein, the tank truck equipment having steps 20 is a forced-air oil cooler having a hydraulic motor, commonly referred to as hydraulic oil cooler 10. However, it is envisioned and will be readily apparent to those skilled in the art that the tank truck equipment may comprise any other apparatus, device, component or system that is typically affixed to a frame rail FR of a tank truck TT. By way of example and not limitation, the tank truck equipment may be a hydraulic drive system configured for driving additional tank truck equipment, such as pumping equipment comprising a blower, a compressor, a vacuum pump or the like. Regardless, the tank truck equipment having steps 20 is constructed so as to eliminate the need for dedicated space on the frame rail FR for steps and thereby increase the amount of space available along the length of the frame rail FR of the tank truck TT for mounting other components and/or equipment.

The hydraulic oil cooler 10 is mounted to the frame rail FR of the tank truck TT at a convenient location along the length of the frame rail FR to allow a person to access the rear portion of the tank truck TT, for example behind the cab above the frame of the tank truck TT. As used herein the term "mounted" is intended to mean attached, affixed, secured or the like by any suitable means for securely retaining the hydraulic oil cooler 10, and thus steps 20, on the tank truck TT at all relevant times. As shown herein, hydraulic oil cooler 10 comprises at least one, and preferably a pair, of mounting flanges 11 configured for mounting the hydraulic oil cooler 10 to the frame rail FR of the tank truck TT. By way of example and not limitation, the mounting flange(s) 11 may be affixed to the frame rail FR by one or more fasteners, such as threaded screws or bolts. Regardless, the mounting flange(s) 11 are likewise affixed to a housing 12 of the hydraulic oil cooler 10 in a suitable manner.

The housing 12 of the hydraulic oil cooler 10 comprises a first side 13, and more particularly a right-hand side as depicted herein, a second side 14 (see FIG. 3), and more particularly a left-hand side as depicted herein, opposite the first side 13, The housing 12 further comprises a front side 15, a rear side (not shown) opposite the front side 15, a top side 16, and an optional bottom side (not shown) opposite the top side, such that the housing 12 defines a generally rectangular box-shaped enclosure for containing a variety of mechanical, electrical, hydraulic and/or pneumatic components in a conventional manner. In the exemplary embodiment shown and described herein, a mounting flange 11 is affixed to each of the first side 13 and the second side 14 of the housing 12 adjacent to the rear side of the housing 12. In this manner, the hydraulic oil cooler 10, and particularly steps 20, extend outwardly from the frame rail FR of the tank truck TT a sufficient distance to allow a person to access the steps 20, as well as components of the hydraulic oil cooler 10, as will be described hereafter.

As best seen in FIG. 2, the hydraulic oil cooler 10 has an opening formed in the first side 13 that defines a heat exchanger 17 for conducting heat transfer between the ambient and the interior of the housing 12. As best seen in FIG. 3, hydraulic oil cooler 10 has another opening formed in the second side 14 of the housing 12 opposite the first side 13. A fan 18 is disposed within the opening formed in the second side 14 of the housing 12 for discharging air from the interior of the housing 12. If desired, fan 18 may be provided with a screen, shield, cage, grid or the like for covering the blades of the fan 18 to protect the blades, as well as to prevent a person from intentionally or accidentally contacting the rotating blades during operation of the hydraulic oil cooler 10. Hydraulic oil cooler 10 may comprise additional components, elements and/or structures associated with operation and/or maintenance. By way of example only and not limitation, hydraulic oil cooler 10 may comprise an oil filler cap 19A disposed, as shown herein, on the top side 16 of the housing 12, and an oil filter 19B disposed, as shown herein, on the top side 16 and the rear side of the housing 12, in a conventional manner for a known purpose.

The function and operation of the hydraulic oil cooler 10 is well known to those skilled in the art and is not relevant to the novel and non-obvious subject matter of the present invention. For purposes of the present invention, is it sufficient that the hydraulic oil cooler 10 is a component of tank truck equipment that is operable to extract heat from a hydraulic drive system and thereby prevent an overheating condition that may result in a failure of other equipment, such as a hydraulic motor, blower, compressor, vacuum pump or the like. Regardless, the hydraulic oil cooler 10, and more particularly the housing 12 of the hydraulic oil cooler 10, is provided with steps 20 configured and constructed in compliance with Part 399, Subpart 207 of the FMCSA regulations.

As shown herein, steps 20 comprise at least one, and preferably, a pair of mounting plates 22. In addition, steps 20 comprise at least a lower, or bottom, step 24, a middle, or intermediate, step 26, and an upper, or top, step 28. Mounting plate(s) 22 mount the bottom step 24 and the intermediate step 26 to the housing 12 of the hydraulic oil cooler 10. In the illustrated exemplary embodiment, the bottom step 24 and the intermediate step 26 are disposed between and affixed to a pair of spaced apart mounting plates 22 in a suitable manner, for example by machine rivets or threaded fasteners. The assembly of the bottom step 24, intermediate step 26 and the mounting plates 22 is in turn affixed to the first side 13 and the second side 14 of the housing 12 of the hydraulic oil cooler 10 in a suitable manner, for example by threaded fasteners. The top step 28 is disposed on and affixed to the top side 16 of the housing 12 of the hydraulic oil cooler 10 in any suitable manner, for example by an adhesive or by welding, brazing, or the like.

Regardless, the bottom step 24 and the intermediate step 26 extend (i.e., project) outwardly from the housing 12 of the hydraulic oil cooler 10 in a direction away from the frame rail FR of the tank truck TT, such that a person can utilize the steps 20 to access the rear portion above the frame and behind the cab of the tank truck TT. As required by Part 399, Subpart 207 of the FMCSA regulations, the bottom step 24 is positioned on the housing 12 of the hydraulic oil cooler 10 so that the vertical height of the first step is no more than 609 millimeters (24 inches) above the ground. In addition, the design of steps 20 includes at least one intermediate step 26 of sufficient size to accommodate two feet of a person attempting to utilize the steps 20 to access a rear portion of the tank truck TT. In particular, the depth of each of the bottom step 24 and the intermediate step 26, and the clearance between bottom step 24 and intermediate step 26, is at least one 127 millimeter (5 inch) disc, as required by the regulations. Furthermore, each of the bottom step 24 and the intermediate step 26 is at least wide enough to fit two such discs on the step or in a step recess with no exterior overhang in satisfaction of the FMCSA regulations. As such, the width of the bottom step 24 and the intermediate step 26 is at least about 254 millimeters (10 inches). More preferably, the width of the bottom step 24 and the intermediate step 26 is between about 254 millimeters (10 inches) and about 609.6 millimeters (24 inches). In a preferred embodiment, the width of each of the bottom step 24 and the intermediate step 26 is between about 254 millimeters (10 inches) and about 381 millimeters (15 inches). In a particularly advantageous embodiment, the width of step 24 and step 26 is about 284.5 millimeters (11.2 inches).

The top step 28 may be configured as a step or a deck plate according to Part 399 of the FMCSA regulations. Regardless, the top step 28 complies with the regulations with respect to minimum size, and in particular width and depth. As shown in the illustrated exemplary embodiments, the construction of each of the bottom step 24, the intermediate step 26 and the top step 28 is of a slip-resistant design that minimizes the accumulation of foreign matter, such as grease, snow, ice, mud or other debris, and affords protection from accidental slipping by a person attempting to access the rear portion of the tank truck TT. By way of example only and not limitation, the steps 24, 26 and 28 may be made of a substantially rigid plastic, composite or metal material and may comprise a predetermined surface pattern 30 on the upper surface thereof configured for increasing the amount of gripping and traction provided by the steps. In the exemplary embodiments illustrated herein, the upper surface of each of the bottom step 24, the intermediate step 26 and the top step 28 has a predetermined surface pattern 30 including a plurality of openings formed through the step and/or a plurality of raised protuberances on the upper surface of the step. The openings and the protuberances of the surface pattern 30 serve to catch foreign matter on the soles of a person's shoes and the openings allow the foreign matter to fall below the steps and onto the ground. If desired, the material of the bottom step 24, the intermediate step 26 and the top step 28 may further be a self-cleaning material so that foreign matter, such as ice, snow, mud, etc, does not tend to accumulate on the upper surface of the steps.

The foregoing has described one or more exemplary embodiments of tank truck equipment having steps in compliance with the FMCSA regulations set forth at 49 C.F.R. § 399.207 governing the design, construction and size of steps for accessing a rear portion behind the cab of a truck or truck-tractor. In an exemplary embodiment shown and described herein, the tank truck equipment is a hydraulic oil cooler having steps in compliance with the requirements of Subpart 399.207. While an exemplary embodiment of tank truck equipment has been shown and described for the purpose of providing a complete and accurate description of the invention sufficient to enable one of ordinary skill in the art to make, use and practice the invention, it will be readily apparent that the invention may take many forms and may be used in many applications, including for example and without limitation, other tank truck equipment such as a hydraulic drive system including a blower, compressor or vacuum pump for loading and/or unloading solid dry bulk goods and/or liquid materials from a tank trailer. Accordingly, the preset invention may be applied to other tank truck components or other tank truck equipment without departing from the spirit and scope of the invention, which is intended to be limited only by the appended claims.

That which is claimed is:

1. Tank truck equipment for a tank truck, comprising:
    a hydraulic oil cooler comprising a housing defining an enclosure for housing a heat exchanger of the hydraulic oil cooler disposed on a first side of the housing and a fan of the hydraulic oil cooler disposed on a second side of the housing opposite the first side of the housing, the housing configured for attachment to a longitudinal frame rail of the tank truck behind a cab adjacent a rear portion of the tank truck; and
    a plurality of steps disposed on the housing for accessing the rear portion of the tank truck, the steps comprising at least a bottom, an intermediate and a top step;
    wherein the bottom step and the intermediate step are mounted adjacent to a front side of the housing such that the bottom step and the intermediate step extend outwardly from the housing in a lateral direction away from the longitudinal frame rail; and
    wherein the top step is disposed on and affixed to a top side of the housing such that the top step extends outwardly in the lateral direction away from the longitudinal frame rail between the frame rail and the intermediate step; and
    wherein the hydraulic oil cooler further comprises at least one of an oil filler cap and an oil filter disposed on the top side of the housing.

2. Tank truck equipment according to claim 1, further comprising at least one mounting plate for mounting the bottom step and the intermediate step to the housing, and wherein the at least one mounting plate is affixed to the bottom step and the intermediate step and to one of the first side and the second side of the housing.

3. Tank truck equipment according to claim 1, wherein the housing further comprises at least one mounting flange for mounting the housing to the frame rail of the tank truck, and wherein the at least one mounting flange is affixed to one of the first side and the second side of the housing and to the frame rail of the tank truck.

4. Tank truck equipment according to claim 1, wherein the bottom step and the intermediate step are disposed between and affixed to a pair of mounting plates spaced apart in a longitudinal direction generally perpendicular to the lateral direction.

5. Tank truck equipment according to claim 4, wherein the width of each of the bottom step and the intermediate step is at least about 254 millimeters (10 inches).

6. Tank truck equipment according to claim 5, wherein the width of each of the bottom step and the intermediate step is between about 254 millimeters (10 inches) and about 609.6 millimeters (24 inches).

7. Tank truck equipment according to claim 6, wherein the width of each of the bottom step and the intermediate step is between about 254 millimeters (10 inches) and about 381 millimeters (15 inches).

8. Tank truck equipment according to claim 1, wherein each of the bottom step and the intermediate step is of sufficient size to accommodate two feet of a person utilizing the steps to access the rear portion of the tank truck.

9. Tank truck equipment according to claim 1, wherein each of the plurality of steps comprises a predetermined surface pattern on an upper surface for increasing the amount of gripping and traction provided by the step.

10. Tank truck equipment according to claim 9, wherein the predetermined surface pattern includes at least one of a plurality of openings formed through the step and a plurality of raised protuberances on the upper surface of the step.

11. Tank truck equipment according to claim 1, wherein each of the plurality of steps is made of a self-cleaning material so that foreign matter does not accumulate on an upper surface of the step.

12. Tank truck equipment according to claim 1, wherein the depth of each of the bottom step and the intermediate step is at least about 127 millimeters (5 inches).

13. Tank truck equipment according to claim 12, wherein the vertical distance between the bottom step and the intermediate step is at least about 127 millimeters (5 inches).

14. Tank truck equipment according to claim 1, wherein the top step is in alignment with at least one of the bottom step and the intermediate step in the lateral direction away from the longitudinal frame rail.

15. A hydraulic oil cooler for a tank truck, comprising:
    a heat exchanger;
    a fan;
    at least one of an oil filler cap and an oil filter;
    a housing defining an enclosure for housing the heat exchanger, the fan, and the at least one of the oil filler cap and the oil filter, the housing having a first side, a second side opposite the first side, a top side extending between the first side and the second side and a front side extending between the first side and the second side, the housing configured for attachment to a longitudinal frame rail of the tank truck adjacent to a rear portion of the tank truck, the heat exchanger being disposed on the first side of the housing, the fan being disposed on the second side of the housing, and the at least one of the oil filler cap and the oil filter being disposed on the top side of the housing; and a bottom step and an intermediate step disposed on the housing adjacent the front side and extending outwardly from the housing in a lateral direction away from the longitudinal frame rail for accessing the rear portion of the tank truck, and a top step disposed on the top side of the housing and extending outwardly in the lateral direction away from the longitudinal frame rail between the frame rail and the intermediate step.

16. The hydraulic oil cooler according to claim 15, wherein the width of each of the bottom step and the intermediate step is between about 254 millimeters (10 inches) and about 381 millimeters (15 inches).

17. The hydraulic oil cooler according to claim 15, wherein the top step, the bottom step and the intermediate step are each made of a slip-resistant material that is self-cleaning, and wherein the top step, the bottom step and the intermediate step each further comprise a predetermined surface pattern on an upper surface for increasing the amount of gripping and traction provided by the step.

18. The hydraulic oil cooler according to claim 15, wherein the top step is in alignment with at least one of the bottom step and the intermediate step in the lateral direction away from the longitudinal frame rail.

\* \* \* \* \*